USO05829857A

United States Patent [19]
Olugboji

[11] Patent Number: 5,829,857
[45] Date of Patent: Nov. 3, 1998

[54] TRANSPARENCY FOLDER AND HOLDER APPARATUS

[76] Inventor: Bunmi Olugboji, 2875 W. Highland, #1132, Chandler, Ariz. 85224

[21] Appl. No.: 801,436

[22] Filed: Feb. 18, 1997

[51] Int. Cl.$^6$ .................................................. G03B 21/14
[52] U.S. Cl. ............................................. 353/120; 353/97
[58] Field of Search ...................... 353/97, 120, DIG. 1, 353/DIG. 5

[56] References Cited

U.S. PATENT DOCUMENTS

| | | | |
|---|---|---|---|
| 3,531,193 | 9/1970 | Diehl | 353/97 |
| 3,709,590 | 1/1973 | Bisberg | 353/120 |
| 3,913,740 | 10/1975 | Bisberg . | |
| 4,137,650 | 2/1979 | Hayes . | |
| 4,203,659 | 5/1980 | Constantine et al. | 353/120 |
| 4,679,923 | 7/1987 | Nielsen | 353/120 |
| 4,688,911 | 8/1987 | Simbal | 353/97 |
| 4,787,738 | 11/1988 | Joffe | 353/120 |
| 5,121,984 | 6/1992 | Jones | 353/88 |
| 5,198,846 | 3/1993 | Zilber | 353/120 |
| 5,321,451 | 6/1994 | Olugboji | 353/120 |
| 5,469,235 | 11/1995 | Zako | 353/97 |
| 5,475,453 | 12/1995 | MacCarthy | 353/DIG. 1 |

*Primary Examiner*—William Dowling
*Attorney, Agent, or Firm*—H. Gordon Shields

[57] ABSTRACT

Folder apparatus for holding and positioning a plurality of transparencies for projection by an overhead projector includes a base panel with two wing panels extending outwardly and in opposite directions from and secured to the base element. The transparencies are disposed against one wing panel and are movable from the position against the one panel to a position on the base panel for projection, and are movable from the projection position on the base panel to a storage position against the other panel. Transparencies include a base element with extensions through which extend holes or apertures. The holes or apertures receive guide rods which are secured to the base panel. The transparencies move on the guide rods. A gradual reveal frame for gradually revealing material on the transparency being projected is also disclosed.

25 Claims, 6 Drawing Sheets

FIG. 10

TRANSPARENCY FOLDER AND HOLDER APPARATUS

BACKGROUND OF THE INVENTION

1. Field of the Invention

This invention relates to holder apparatus for transparencies and, more particularly, to a folder for holding a plurality of transparencies for sequential projection.

2. Description of the Prior Art

U.S. Pat. No. 3,709,590 (Bisberg) discloses a three-leaf folder for holding transparencies to be projected by an overhead projector. The leaves are hinged to a base element. The base element is disposed on the top surface of an overhead projector. The apparatus includes a support frame against which the transparencies may be disposed. Multiple transparencies may be projected, but the transparencies are overlays, and may accordingly may not be projected selectively individually.

U.S. Pat. No. 3,913,740 (Bisberg) discloses another folder for use with an overhead projector. The apparatus includes structure similar to that of the '590 Patent. The apparatus of the '740 Patent may be used with the apparatus of the '590 Patent. Both patents are by the same patentee. The apparatus includes four separate elements, connected together, with a base element and three elements secured to the sides of the base element. A plurality of transparencies is secured between two of the hinged elements.

U.S. Pat. No. 4,137,650 (Hayes) discloses a teaching aid for transparencies usable with an overhead projector. The apparatus includes a base element to which a number of transparencies are secured for sequential or individual projection. The base element includes four flaps foldable over the base element to define a container. The elements are hinged together to comprise a unitary structure.

U.S. Pat. No. 5,321,451 (Olugboji), the inventor of which is the inventor of the present invention, discloses folder and holder apparatus for holding a plurality of transparencies for sequential projection. The transparencies are held at one edge and move in slots or tracks for sequential positioning and projection. The holder apparatus includes two wing panels, one on each side of a center transparent portion. The transparencies are disposed against one wing panel until moved into projection position over the center portion and then are disposed against the opposite wing panel for storage purposes.

SUMMARY OF THE INVENTION

The invention describes and claimed herein comprises a folder for holding a plurality of transparencies which may be individually or sequentially projected by an overhead projector. The apparatus includes a center base element which includes an open or transparent portion on which the transparencies are disposed for projecting and with a pair of outwardly extending side panels secured to and extending oppositely outwardly from the center base element. The two side panels are hingedly secured to the center base panel. A pair of rods secured to the base panel guides and positions the transparencies. The transparencies are secured to and are movable on the rods from a storage or pre-projection position on one side of the center base element to the projection position on the base element and then to the opposite side for storage purposes.

Among the objects of the present invention are the following:

To provide new and useful folder apparatus for holding a plurality of transparencies to be projected by an overhead projector;

To provide new and useful apparatus for holding a plurality of transparencies for sequential and individual projection;

To provide new and useful folder apparatus for holding a plurality of transparencies, with the transparencies movable from a first storage or pre-projection position to a projection position, and from the projection position to a second storage position;

To provide new and useful folder apparatus for sequentially dispensing transparencies for presentation;

To provide new and useful folder apparatus for sequentially projecting transparencies in order and for easily and quickly reversing the order as desired;

To provide new and useful folder apparatus having a base element and two panels secured to the base element, and the panels are pivotally or hingedly secured to the base element;

To provide new an useful apparatus for gradually revealing portions of a transparency for projection; and To provide new and useful folder apparatus for holding a plurality of transparencies, and the transparencies are secured to and are movable on rods.

DESCRIPTION OF THE PREFERRED EMBODIMENT

Figure 1:
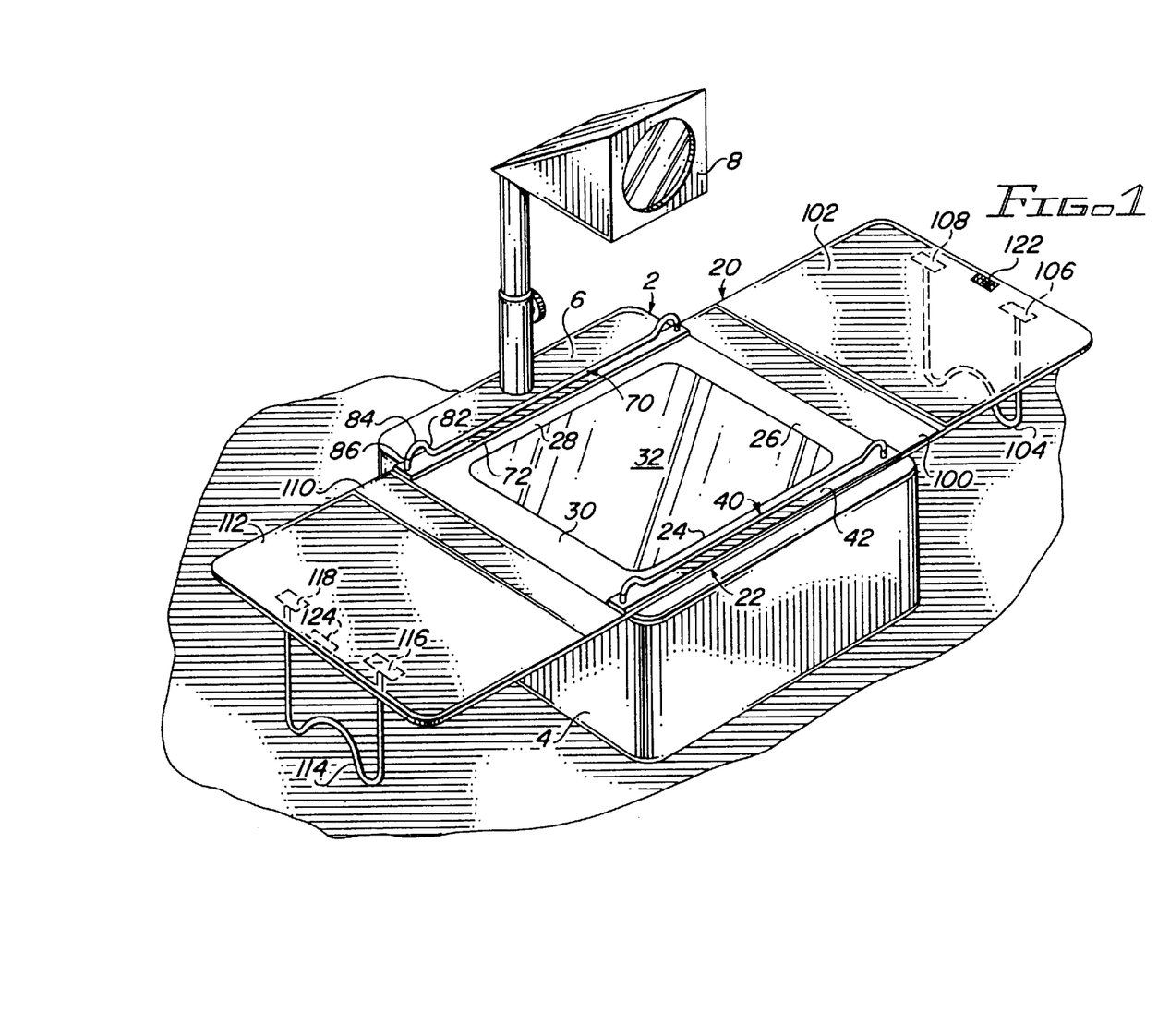
FIG. 1 is a perspective view of the apparatus of the present invention in its use environment.

FIG. 1 is a perspective view of an overhead or opaque projector 2 with transparency holder and folder apparatus 20 of the present invention disposed on the projector 2. The projector 2 includes a light source cabinet 4 having a top surface 6. The top surface 6 includes a center flat portion on which transparencies are disposed for projection, and on which the apparatus 20 is disposed. Above the light source platform and the top 6 is a projection lens 8.

As is well known and understood, transparencies are disposed on the top 6 of the light source cabinet 4 and, when a light within the cabinet 4 is turned on, the light is projected upwardly, through a transparency disposed on the top 6, towards the projection lens 8, and the subject matter of, or the material on, the transparency is then projected outwardly onto a screen. A user of the apparatus stands by the projector apparatus 2 for discussing the material displayed on the various transparencies and projected onto the screen.

The apparatus 20 includes three pivotally connected portions, a center portion or base 22 and two wing panel portions 102 and 112.

The apparatus 20 of the present invention is shown in its open position or orientation on the top 6 in FIG. 1, and the apparatus 20 is shown in detail in FIGS. 2–9.

Figures 2, 3, 6, 7:
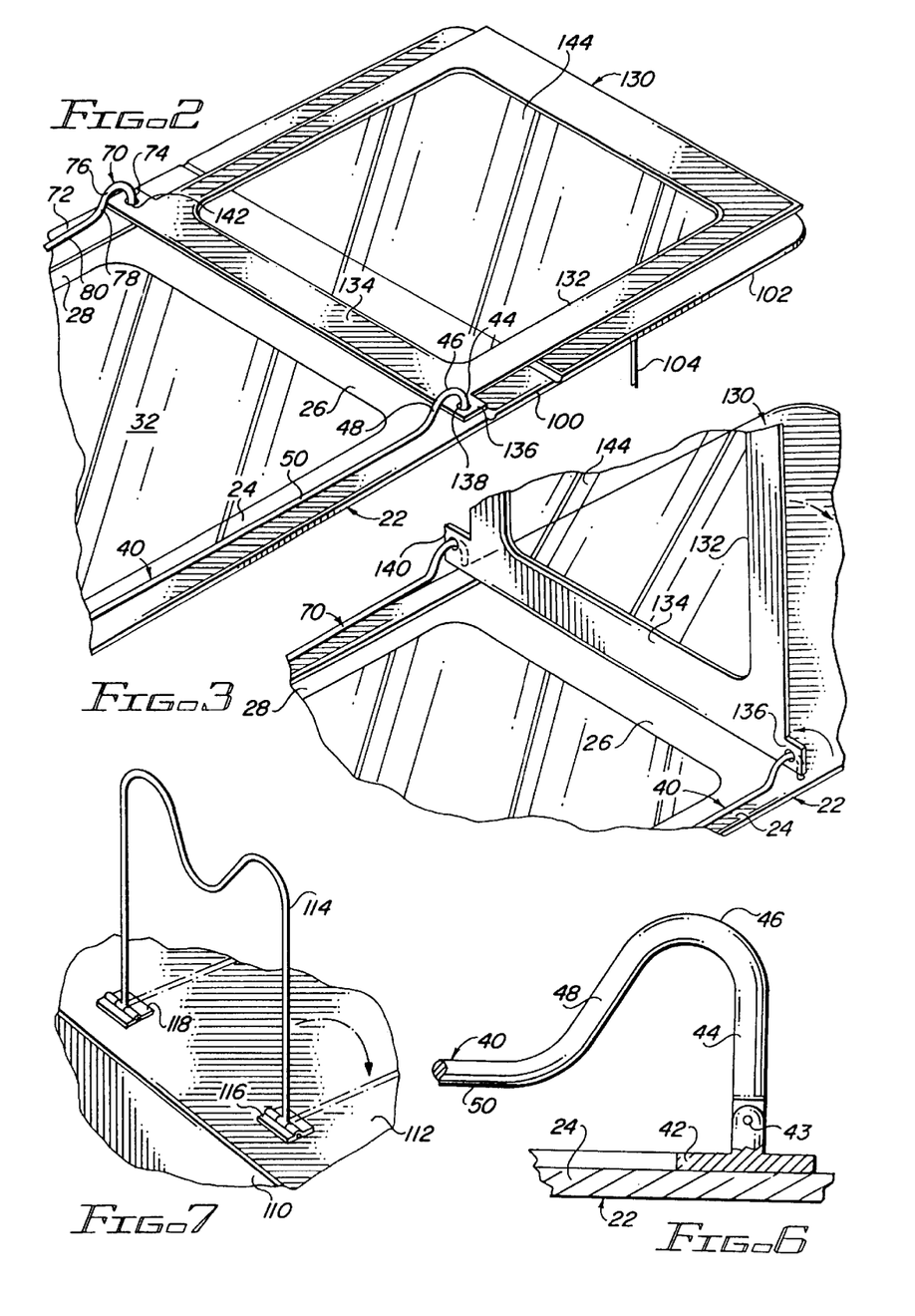
FIG. 2 is a perspective view of a portion of the apparatus of the present invention.
FIG. 3 is a perspective view of a portion of the apparatus of the present invention illustrating the operation of the apparatus of the present invention and sequentially following the illustration of FIG. 2.
FIG. 6 is an enlarged side view in partial section illustrating a portion of the present invention.
FIG. 7 is a perspective view of a portion of the apparatus of the present invention.
Figure 4:
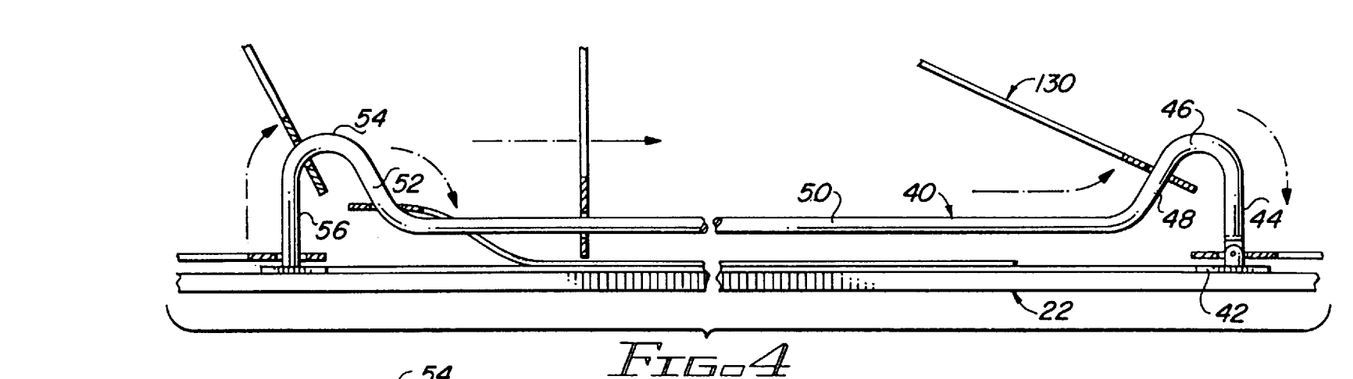
FIG. 4 is an end view taken illustrating the operation of a portion of the present invention.
Figure 5:
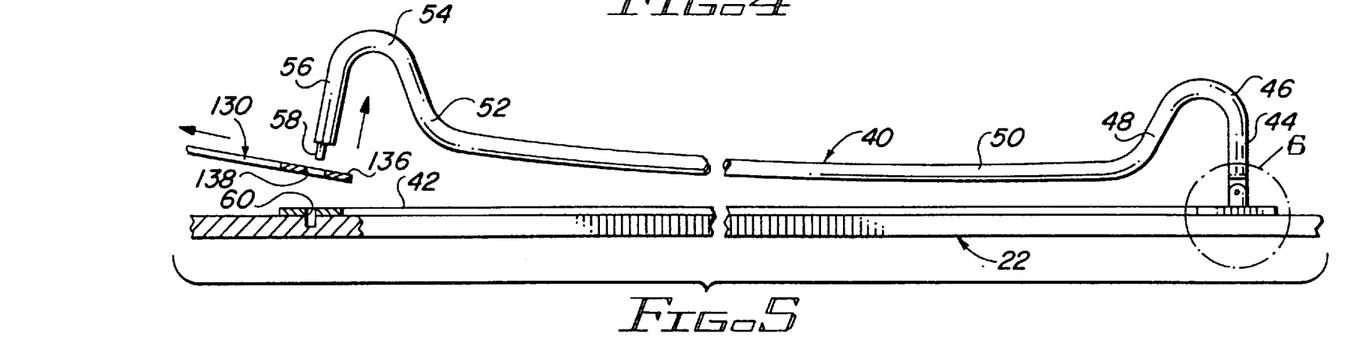
FIG. 5 is an end view sequentially following FIG. 4.

FIG. 2 is a perspective view of a portion of the apparatus 20, FIG. 3 is a perspective view of a portion of the apparatus 20 shown in FIG. 2 showing sequential operation of the apparatus. FIGS. 4 and 5 are end views illustrating the operation of the apparatus 20. In FIG. 4, a transparency is shown moved from a storage or pre-projection position on one end panel to the projection position, and then to a storage position on the other end panel. In FIG. 5, a transparency is shown removed from the apparatus 20.

FIG. 6 is a view in partial section showing a detail of a portion of the center or base frame 22, taken from circle 6 of FIG. 5.

Figure 8:
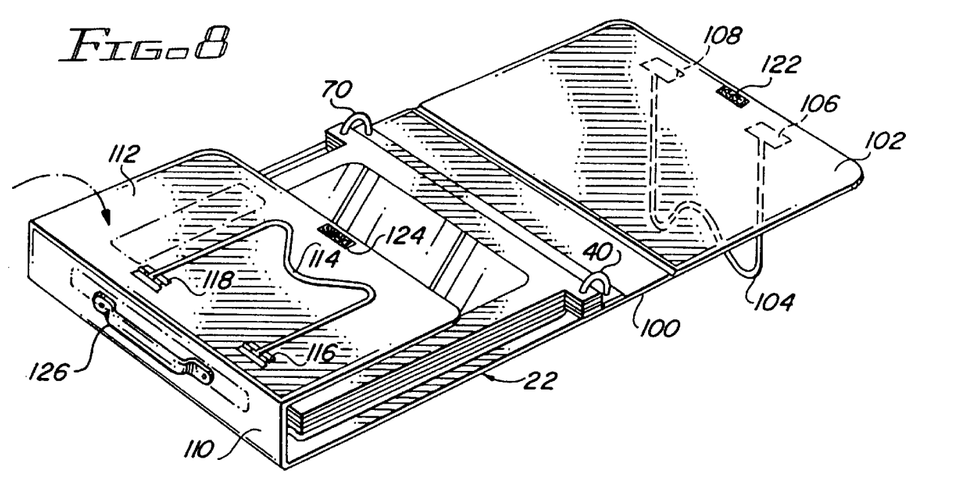
FIG. 8 is a perspective view of a portion of the apparatus of the present invention.
Figure 9:
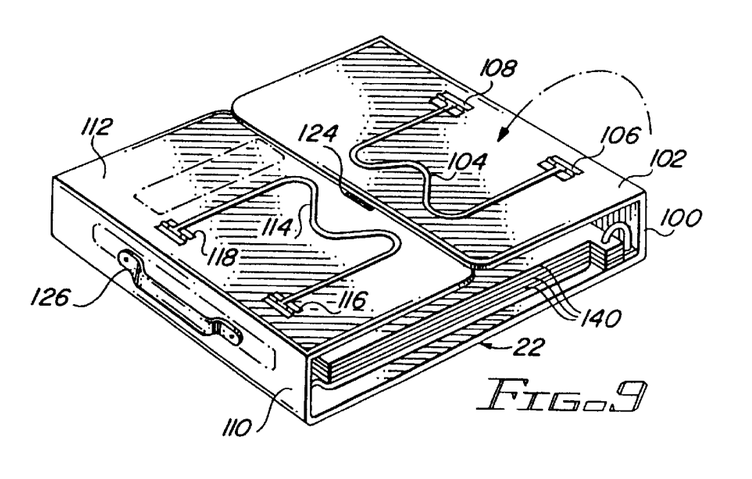
FIG. 9 is a perspective view sequentially following FIG. 8.

FIGS. 7, 8, and 9 are perspective views of the apparatus 20 illustrating the apparatus 20 sequentially being folded, and in its storage condition or state. Dash dot arrows in FIGS. 7, 8, and 9 illustrate the pivoting of the wing panel portions 102 and 112 on their hinge panels relative to the base portion 22.

For the following discussion, reference will be made to all the Figures in general, and specific reference will be made to particular drawing Figures as appropriate.

The transparency folder and holder apparatus 20 includes the three primary portions, a central portion 22 which comprises a base frame and elements secured thereto, as discussed below, and two outer or wing panel portions, including the wing portion or cover 102 and the wing portion or cover 112. The wing portions or covers are appropriately hinged to the base frame 22 by hinge portions 100 and 110, respectively. The wing panels or portions 102 and 112 will also be discussed below. The wing panels comprise cover elements for the central portion 22, as best shown in FIG. 9.

The central or base portion 22, which is the central frame, as mentioned above, includes four perimeter frame members, all of which are shown in FIG. 1. There is a bottom perimeter frame member 24, a pair of side perimeter frame members 26 and 30, and a top or upper perimeter frame member 28.

Within the perimeter frame members is a central area 32. The central area 32 is preferably covered by a transparent supporting element or screen and comprises a projection window on which the transparencies are disposed for projection. The area 32 may be open, if desired.

Secured to the bottom perimeter frame member 24 is a bottom guide frame 40. Secured to the upper perimeter frame member 28 is a top guide frame 70. The two guide frame members 40 and 70 are substantially identical to each other.

The bottom guide frame member 40 includes a base support member 42 which is appropriately secured to the base frame 22.

Extending upwardly from the base support member or element 42 is a vertical rod portion 44 which comprises a vertical end piece. The vertical rod portion 44 is pivotally secured to the base support member 42 by an appropriate hinge pin 43, shown in FIG. 6. The hinge pin 43 allows the vertical rod 44, and the associated elements, to pivot on the base member 42 to add and remove transparencies as desired. this is shown in FIG. 5.

As best shown in FIGS. 4 and 5, there is a top curved portion 46 at the top of the vertical arm 44, and from the top curved piece 46 there is a downwardly and inwardly sloping portion 48. The sloping portion 48 extends to a generally horizontal portion 50 which is spaced upwardly from the base 42.

At the opposite end of the guide frame 40 from the members or portions 44, 46, and 48, are mirror images of them in the reverse order. Thus there is an upwardly and outwardly extending portion 52, a top portion 54, and a vertical portion 56. The vertical portion 56 is in turn appropriately secured to the base support member or element 42 of the base 22.

The top guide frame 70, portions of which are best shown in FIGS. 1, 2, and 3, is substantially identical to, but is a mirror image of, the bottom guide frame 40, as indicated above. The two guide frames 40 and 70 are disposed generally parallel to each other.

The guide frame 70 includes a base support member 72 which is appropriately secured to the frame member 28.

Extending upwardly from the base 72 is a vertical arm 74. The vertical arm is pivotally secured to the base 72. At the top of the vertical arm 74 is a top curved portion 76. The top curved portion 76 extends to a downwardly and inwardly extending sloping portion 68. The sloping portion 68 extends to a generally horizontal portion 80.

At the opposite end of the horizontal rod portion 80 there is an upwardly and outwardly extending portion, a top curved portion, and a vertically extending portion, all substantially mirror images of the elements 74, 76, and 78.

Again, the top guide frame 70 is generally parallel to the bottom guide frame 40.

The bottom ends of the vertical members 56 and 86 terminate in pins. A pin 58 is shown in FIG. 5. In FIG. 5, the guide frame 40 is shown pivoted upwardly a slight distance above the frame 42, with the pin 58 disposed above a hole or bore 60 in the base support 42. The pin 58 is shown spaced apart from the hole 60 and the base 42, and the transparency 130 is shown disposed between the pin and the base, in the position of either being inserted into the apparatus 20 or being taken from the apparatus 20, as will be discussed below.

The vertical element 86 similarly terminates in a pin, not shown, which also extends into a hole or bore and is appropriately secured therein.

The two cover or wing panels 102 and 112 are appropriately secured to the base frame 22 by hinge portions 100 and 110, respectively. The length of the hinge portions or elements 100 and 110 corresponds to the height of the vertical arms 44 and 74 of the guide frames 40 and 70. This is best shown in FIGS. 8 and 9. The hinge elements 100 and 110 are, of course, appropriately hingedly or pivotally secured to the base frame 22 and to the respective covers 102 and 112. FIG. 8 shows the apparatus 20 in its partially open configuration, with the wing panel or cover 112 closed, or folded over the center portion 22, and the wing portion or panel 102 open, generally parallel to the center portion 22. A plurality of mounted transparencies 130 is shown secured to the base frame 22 and disposed over the center portion 22.

In FIGS. 1, 2, and 3, the wing covers or panels 102 and 112 are shown in their open position. The plurality of mounted transparencies 140 are shown in FIGS. 2 and 3 secured to the guide frames 40 and 70.

Support elements 104 and 114 are shown secured to the panels 102 and 112, respectively. In FIG. 1 the support elements 104 and 114 are shown in their down position, supporting the panels 102 and 112, as required. In FIG. 8, the support 104 is shown in its down position, and the support 114 is shown in its folded, storage position disposed on the panel 112.

The support 114 is shown in detail in FIG. 7. FIG. 7 comprises an enlarged perspective view of a portion of the panel 112, as secured to the hinge panel 110, with the support element 114 in its operative position for supporting the panel 112. The support 114 is secured to the panel 112 by a pair of hinge elements 116 and 118. The support 114 comprises a generally U-shaped element, which includes a pair of arms which are secured to the hinge elements 116 and 118, and a middle or connecting element which extends between the arms. The connecting element is shown with a bow in it for strength purposes.

The support elements 104 and 114 are substantially identical to each other.

In FIG. 9 both support elements 104 an 114 are shown in their folded, storage positions disposed on their respective panels 102 and 112.

The operation of the transparencies 130 is illustrated primarily in FIGS. 4 and 5, sequentially. However, reference will also be made to other Figures, such as FIGS. 1, 2, and 3, as appropriate, in the following discussion.

Each mounted transparency 130, perhaps best shown in FIGS. 3 and 4, include a perimeter frame 132 to which is secured a transparency 144. The frame 132 may be made of paper, plastic, or any appropriate material, as desired. The transparency 144, of course, includes any information or data which is desired to be projected by the projector 2 onto a screen (not shown) for a presentation.

If desired, pocket or sheet protector elements may be used for the transparencies. Whatever support element is used for the transparencies, the element will be secured to the guide frames 40 and 70 and will be movable thereon as generally described for illustrative purposes in conjunction with the perimeter frame 132.

Each perimeter frame 132 includes a base element 134. The base element 134 includes a pair of extensions 136 and 140 and through which extend holes or apertures 138 and 142, respectively (see FIG. 2). The frame members 40 and 70 extend through the holes 138 and 142, respectively, as best shown in FIG. 2. Or, in other words, the transparencies 130 move on the guide frames 40 and 70, as discussed below.

As best shown in FIG. 8, the extensions 136 and 140 extend outwardly beyond the rest of the transparency which is dimensioned to fit between the guide frames 40 and 70. Or, in other words, the guide frames 40 and 70 are disposed outwardly from the main portion of each transparency 130, and specifically outwardly from the frame 132.

The frame 132 is flexible at the base element 134 to the extent that the transparencies 130 may flex as required to lie flat for projection purposes, as shown in FIG. 4, and for storage purposes, as shown in FIGS. 8 and 9.

For inserting and removing a transparency 130, the vertical arms 56 and 86 are released from their respective frame elements, as shown in FIG. 5. The transparency 130 is then put in place, with the holes or apertures 138 and 142 in the extensions 136 and 140, respectively, aligned with the members 56 and 86, respectively. The transparencies are then moved as appropriate or desired on the guide frames. The pins in the vertical members are then reseated in their frame elements and appropriately secured thereto.

In FIGS. 2 and 3, the vertical members or portions 44 and 74 of the guide frames are shown extending through the holes 138 and 142, respectively. The transparency 130 is shown disposed on the panel 102 in a pre-projection state or position in FIG. 2, and is shown in FIG. 3 pivoted upwardly, in the process of being moved to the projection position on the central area 32 of the base frame 22. The transparency 130 has already been moved upwardly on the vertical portions 44 and 74 and is on the top curved portions 46 and 76.

The continued movement of the transparency 130 is illustrated sequentially in FIGS. 4 and 5. From the position or orientation of the transparency 130 shown in FIG. 3, the transparency is moved as shown in FIG. 4, namely downwardly on the sloping portions 48 (and 78), and to the center area 32 for projection.

After projection, the transparency is moved along the horizontal portions 50 (and 80) and then upwardly on the sloping portions 52 (and 82) and over the curved top portions 54 (and 84) and then downwardly on the vertical portions 56 (and 86) and to the post-projection position on the panel 112.

The arrows in FIG. 4 shows how the transparencies may be returned to the panel 102 for storage purposes. In other words, a reversal of the procedure just described returns the transparencies to the opposite panel 102, if desired.

FIGS. 8 and 9 show how the apparatus 20 is closed for storage and transport purposes.

Sequentially, the apparatus 20, with a plurality of mounted transparencies 130, is configured as a book, with the panels 102 and 112 folded over the center portion 32, as best shown in FIG. 9. Then, the folded apparatus 20 may be disposed on the top 6 of a projector 2, and opened as shown in FIG. 8, with the wing panels 102 and 112 sequentially opened as shown in FIGS. 8 and 1.

The stand or support elements 104 and 114 are pivoted outwardly to support the panels 102 and 112, respectively, on a table or other surface on which the projector apparatus 2 is disposed, as the panels are opened. The transparencies 130 are appropriately stacked, as shown in FIGS. 9 and 8, as the panels 102 and 112 are opened.

To begin operation of the projector 2 and the apparatus 20, the transparencies 130 are shifted or moved on the guide frames 40 and 70 to their pre-projection position. The pre-projection position may be either on the panel 102 or the panel 112, as desired.

To show or project the first transparency 140, the top transparency 130 is moved upwardly and downwardly, as discussed above, and placed over the center area 32 for projection.

After projection, the transparency is moved again on the guide frames 40 and 70 to the post-projection position on the opposite panel from the pre-projection position.

Sequentially, the top or uppermost transparency on the pre-projection stack is moved onto the center portion 32 for projection. After projection, the transparency is moved to join the stack in the post-projection position.

With the top transparency 130 now in the temporary storage or post-projection position, the next transparency 130 may then be projected by the same movements discussed in the preceding paragraphs.

When the presentation is completed, with all of the transparencies 130 being disposed on the wing panel 112, or 102, as desired or appropriate, the transparencies may then be moved to the transport and storage position as shown in FIGS. 8 and 9. The apparatus 20 is then ready to be refolded for storage. This is also as shown in FIGS. 8 and 9.

For convenience, the panels 102 and 112 may be secured together by appropriate fasteners, such as hook and loop ("Velcro") type fasteners. Hook and loop fastener elements 122 and 124, as best shown in FIG. 8. Obviously, any appropriate fastener elements may be used.

For carrying convenience, an appropriate handle may be secured to a hinge panel. A handle 126 is shown secured to the hinge panel 110.

For convenience, it may be desirable under some circumstances to project a transparency gradually. That is, a transparency may be gradually revealed or exposed for projection, rather than have the entire transparency revealed all at once. To accomplish such gradual revealing, the apparatus of the present invention includes a gradual reveal assembly 200 which may be inserted under the guide frames 40 and 70 and over the central portion of the apparatus and on the base frame 22.

Figure 10:
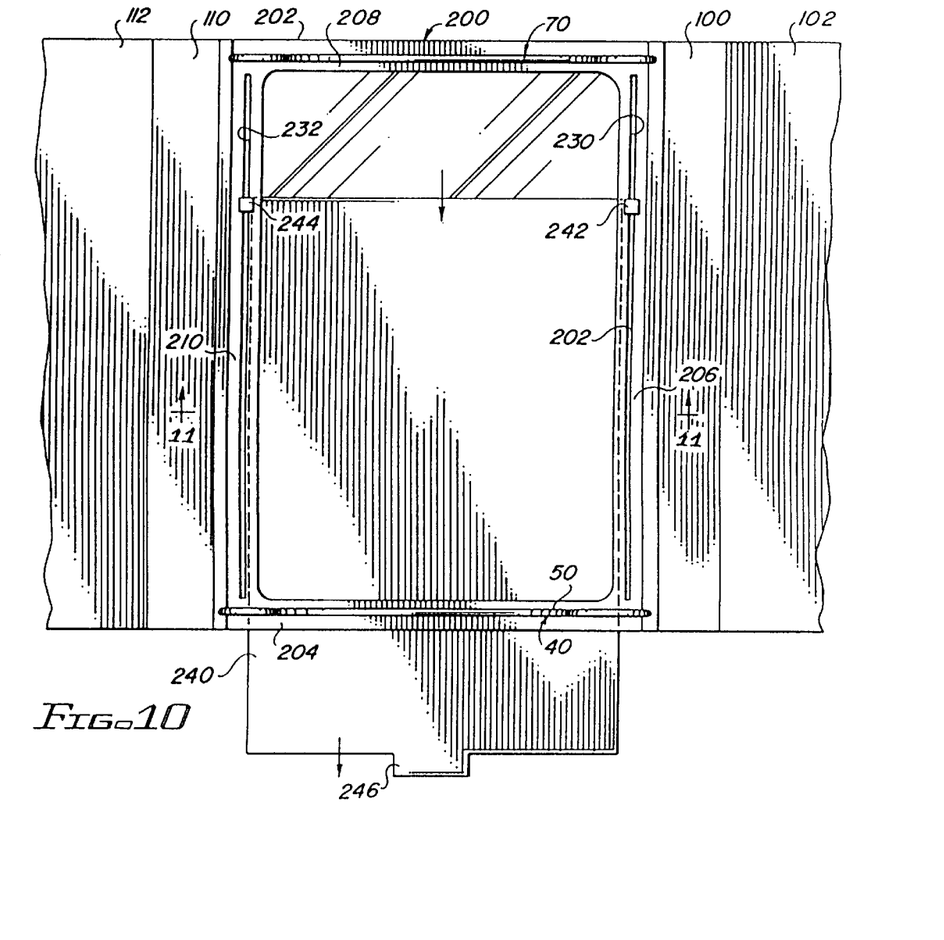
FIG. 10 is a top view of a portion of the apparatus of the present invention.
Figure 11:
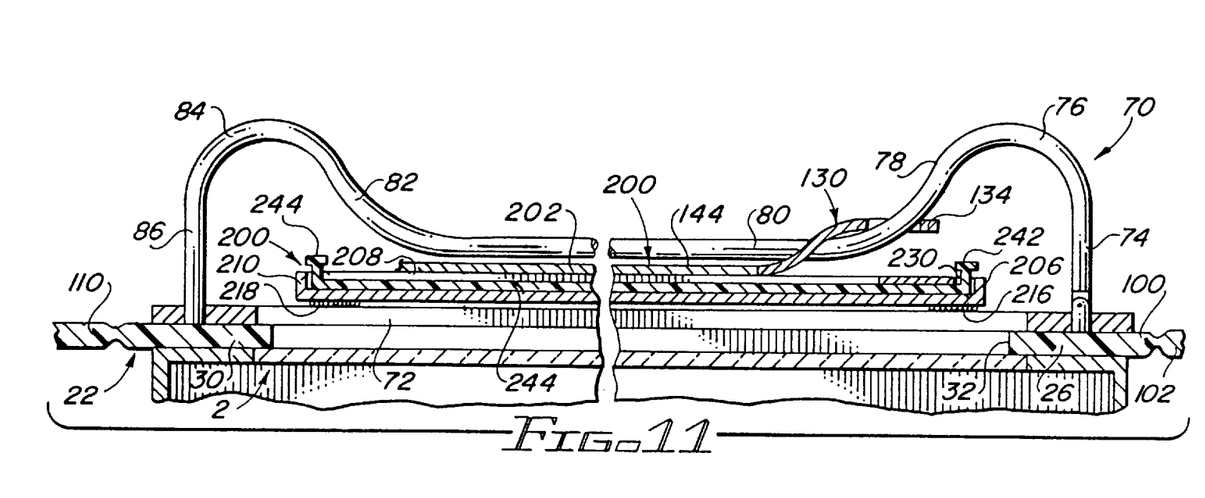
FIG. 11 is a view in partial section taken generally along line 11—11 of FIG. 10.

FIG. 10 is a top view of the central portion of the folder and holder apparatus 20 with the gradual reveal assembly 200 secured thereto. FIG. 11 comprises a view in partial section taken generally along line 11—11 of FIG. 10, illustrating the various elements of the gradual reveal assembly 200 in relation to the associated elements of the base frame 22. The apparatus 20 is shown disposed in FIG. 11 on the light source platform 4 of the transparency projector 2. Specifically, the gradual reveal assembly 200 is disposed over the open central area 32 of the base frame 22. For the following discussion, reference will primarily be made to FIGS. 10 and 11.

The gradual reveal assembly 200 includes a double perimeter frame 202, and the perimeter frame 202 includes four double outer frame members, a double bottom frame member 204, a double side frame member 206, a double top frame member 208, and a double side frame member 210. The four double frame members 204, 206, 208, and 210 are appropriately secured together.

The "double" term indicates that there is an upper and a lower portion to each frame member. This may best be understood from FIG. 11.

The top frame member 208 and the side frame members 206 and 210 are secured together only at their outer peripheries. With their inner peripheries open, the double frame members 206, 208, and 210 define an outer shell frame in which is disposed an opaque panel 240.

The bottom double frame member 204 is open at both its inner periphery and outer periphery, thus allowing the panel 240 to move through the frame member as desired.

The side frame members 206 and 210 include longitudinally extending guide slots 230 and 232, respectively. The guide slots 230 and 232 extend through only the upper portions of the frame members. This is best shown in FIG. 11.

The interior of the frame is open for projections purposes.

The perimeter frame 202 is appropriately secured to the base frame 22 by hook and loop fastener elements. A hook and loop fastener pair 216 and a hook and loop fastener pair 218 are illustrated in FIG. 11. The pairs 216 and 218 include a patch secured to the base frame 22 and a patch secured to the bottom of the frame members 206 and 210. The hook and loop fastener elements allow the gradual reveal assembly 200 to be quickly and easily installed and removed from the frame 22, as required.

In FIG. 11, the fastener pairs 216 and 218 are shown secured to the base support element 72 of the guide frame 70. A similar pair of hook and loop fastener patches will, of course, be secured to the base support element 42. Typically, the loop patches will be secured to the frame elements 42 and 72, while the hook patches will be secured to the bottom of the frame members 206 and 210.

The opaque panel 240 includes a pair of guide elements 242 and 244 on its upper surface. The guide elements 242 and 244 extend upwardly through and move in the guide slots 230 and 232, respectively. The panel 240 also includes a bottom tab 246 which serves as a handle for moving the panel 240 relative to the frame 202 and relative to a transparency 130 disposed over the assembly 200. The tab 246 is essentially an extension of the panel 240.

With the guide elements 242 and 244 disposed in the slots 230 and 232, respectively, the panel 240 is movable longitudinally on the frame 202 as desired by a user to selectively cover and uncover material on a transparency.

As best shown in FIG. 11, the gradual reveal assembly 200 is disposed beneath the rods of the guide frames 40 and 70. In this manner, the gradual reveal assembly 200 does not interfere with the movement of the transparencies 130 on the rods of the guide frames 40 and 70. The location of the pad 240 relative to the transparencies 130 and the central open area 32 controls the light from the projector 2 and accordingly controls the projection of the material on the transparencies 130.

With the opaque panel 240 blocking the light, nothing is projected. As the pad 240 is moved on the slots 230 and 232, the amount of light from the projector 2 is controlled for projecting the desired material on each transparency 130. The amount or extent of the text or charts or illustrations on each transparency that is projected may thus be carefully controlled by the gradual reveal assembly 200.

As may be understood from FIGS. 1–5 and 10 and 11, a transparency 130 moves in one direction on the guide frames 40 and 70. The opaque pad or panel 240 moves on its perimeter frame 202 in a second direction which is generally perpendicular to the movement of the transparency 130.

On the other hand, the gradual reveal assembly 200 need not be used unless it is desired. By using the hook and loop fasteners, or any other appropriate fasteners, the gradual reveal assembly may be easily installed and removed by a user, as desired under particular circumstances.

Figure 12:
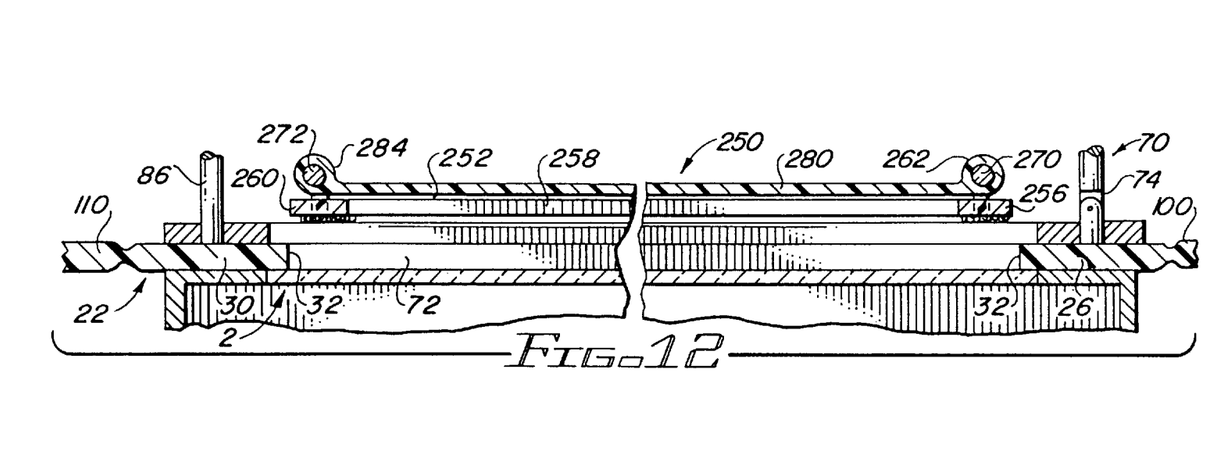
FIG. 12 is a view in partial section of an alternate embodiment of the apparatus of FIGS. 10 and 11.

FIG. 12 comprises a view in partial section of an alternate embodiment 250 of the gradual reveal frame assembly 200. FIG. 12 is similar to FIG. 11.

The gradual reveal assembly 250 includes a perimeter frame 252 which includes four perimeter elements, of which elements 256, 258, and 260 are shown in FIG. 12. The elements 256 and 260 comprise longitudinally extending side frame elements.

A pair of longitudinally extending rod elements 270 and 272 are disposed on the side frame elements 256 and 260, respectively.

The frame 252 is appropriately secured to the frame 22, as by hook and loop fastener pairs, as discussed above.

An opaque panel 280 is movable on the frame 252. The panel 280 includes ring elements 282 and 284 which are disposed on the rods 270 and 272, respectively. The ring elements 282 and 284 allow the panel 280 to move smoothly along the rods 270 and 272 relative to the perimeter frame 252 and relative to the base frame 22 and to the respective guide frames and a transparency being projected.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Folder apparatus for holding transparencies to be projected comprising in combination:

base means for receiving a transparency to be projected;

guide frame means secured to the base means for guiding the transparency to be projected, including a first rod secured to the base means; and transparency means movable on the base means, including
a frame,
a transparency secured to the frame, and
a hole extending through the frame through which the first rod extends for moving the transparency means on the base means for guiding the transparency means as it is moved on the base means.

2. The apparatus of claim 1 in which the guide frame means further includes a second rod secured to the base means and spaced apart from the first rod, and the frame of the transparency means further includes a second hole through which the second rod extends for moving the transparency means on the base means.

3. The apparatus of claim 2 in which the folder apparatus further includes a first wing panel secured to the base means.

4. The apparatus of claim 3 in which the folder apparatus further includes a second wing panel secured to the base means remote from the first wing panel means, and the first and second wing panels pivot away from the base means to open positions for projecting the transparencies.

5. The apparatus of claim 4 in which the first rod of the guide frame means includes
a first vertical arm portion,
a first sloping portion connected to the first vertical arm portion,
a horizontal portion connected to the first sloping portion,
a second sloping portion connected to the horizontal portion remote from the first sloping portion, and
a second vertical portion connected to the second sloping portion.

6. The apparatus of claim 5 in which the second guide rod of the guide frame includes
a first vertical arm portion,
a first sloping portion connected to the first vertical arm portion,
a horizontal portion connected to the first sloping portion,
a second sloping portion connected to the horizontal portion, and a second vertical portion connected to the second sloping portion, and
the transparency means moves on the first and second rods from a pre-projection position on the open first wing panel upwardly on the first vertical portions, downwardly on the first sloping portions to a projection position, and then upwardly on the second sloping portions and downwardly on the second vertical portions and onto the open second wing panel to a post-projection position.

7. The apparatus of claim 6 in which the transparency means further includes a base element on the frame and a first extension and a second extension extending outwardly from the base element, and the first and second holes are respectively in the first and second extensions.

8. The apparatus of claim 1 in which the folder apparatus further includes a first and a second wing panel connected to the base means, and a first and a second stand respectively pivotally connected to the first and second wing panels for supporting the wing panels when the wing panels are pivoted away from the base means.

9. The apparatus of claim 8 in which the first and second wing panels are secured to the base means by first and second hinge portions for pivotally securing the wing panels to the base means.

10. The apparatus of claim 9 in which the base means includes a perimeter frame and a central area on which a transparency is disposed for projection.

11. The apparatus of claim 10 in which the first rod is secured to the perimeter frame.

12. The apparatus of claim 11 in which the guide frame means further includes a second rod secured to the perimeter frame generally parallel to and spaced apart from the first rod, and the transparency means is movable on the first and second rods.

13. The apparatus of claim 1 in which the base means includes
a central portion for receiving the transparency,
a base frame disposed about the central portion, including
a first frame member,
a second frame member generally parallel to and spaced apart from the first frame member,
a third frame member secured to and extending between the first and second frame members, and
a fourth frame member generally parallel to and spaced apart from the third frame member and also secured to the first and second frame members, and the first rod is secured to the first frame member.

14. The apparatus of claim 13 in which the guide frame means further includes a second rod secured to the second frame member, and the transparency means is movable on the first and second rods.

15. The apparatus of claim 14 in which the base means further includes a first wing panel pivotally secured to the third frame member and a second wing panel pivotally secured to the fourth frame member, and the wing panels pivot from closed positions where they overlie the central portion to open positions away from the central portion.

16. The apparatus of claim 15 in which the transparency means further includes a plurality of transparencies disposed on the first wing panel in the open position and sequentially movable in the guide frame means onto the central portion of the base means for projecting and on to the second wing panel in the open position after being projected.

17. The apparatus of claim 15 which further includes a stand pivotally connected to each wing panel for supporting the wing panels when the transparencies are being projected.

18. The apparatus of claim 1 which further includes a first panel pivotally secured to the base means and a second panel pivotally secured to the base means remote from the first panel.

19. The apparatus of claim 18 which further includes means for securing the first and second panels to each other.

20. The apparatus of claim 1 which further includes handle means for carrying the folder apparatus.

21. The apparatus of claim 1 which further includes
a gradual reveal frame secured to the guide frame means, and
an opaque panel movable on the gradual reveal frame for gradually exposing portions of the transparency for projection.

22. The apparatus of claim 21 in which the gradual reveal frame is secured to the guide frame means by hook and loop fastener elements.

23. The apparatus of claim 21 in which the opaque panel includes a tab for moving the pad on the gradual reveal frame.

24. The apparatus of claim 21 in which the gradual reveal frame includes a perimeter frame, and the opaque panel moves on the perimeter frame.

25. The apparatus of claim 24 in which the perimeter frame includes guide slots for guiding the opaque panel, and the opaque panel includes guide elements disposed in the guide slots for guiding the opaque panel.

* * * * *